United States Patent Office 3,228,061
Patented Jan. 11, 1966

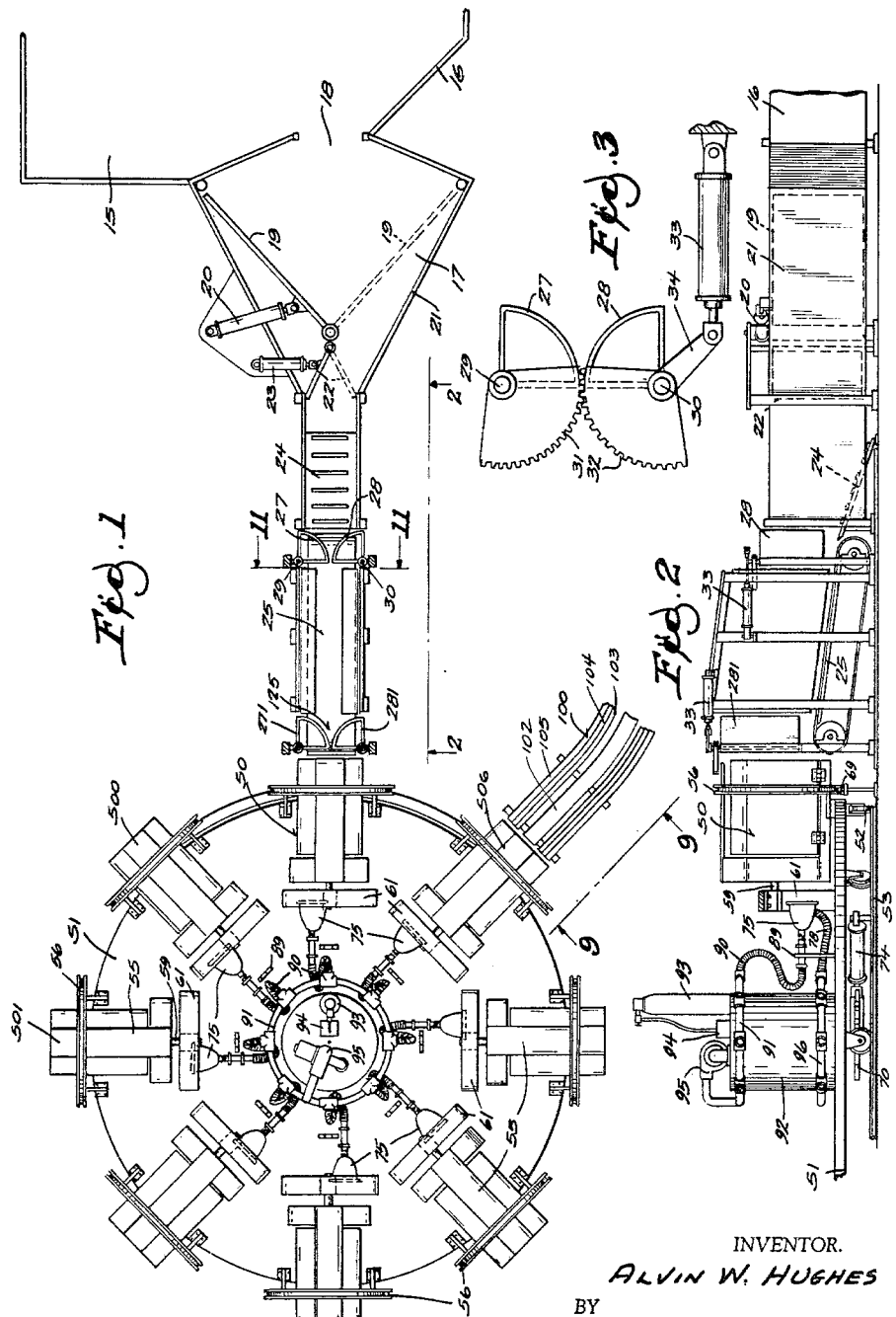

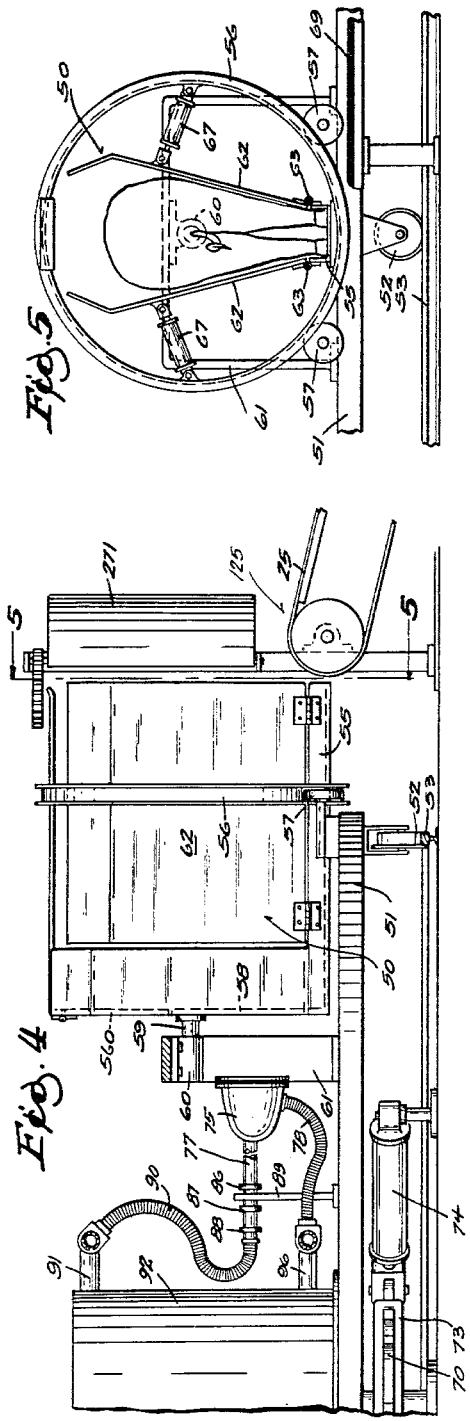

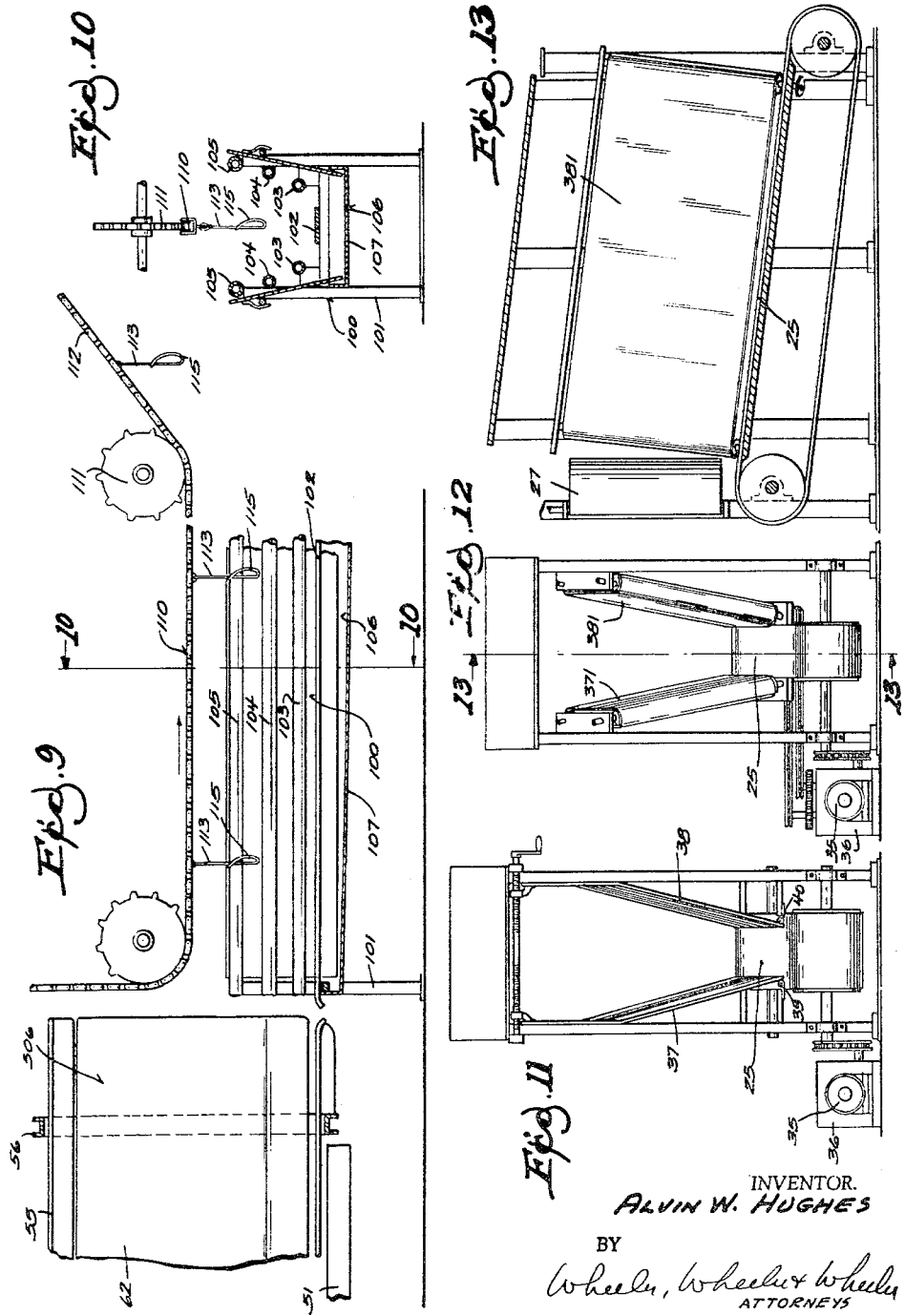

3,228,061
METHOD FOR ANIMAL IMMOBILIZATION
Alvin W. Hughes, 4N194 Church Road,
Bensenville, Ill.
Original application July 5, 1962, Ser. No. 207,701, which is a division of application Ser. No. 839,965, Sept. 14, 1959, now Patent No. 3,081,483, dated Mar. 19, 1963. Divided and this application Dec. 3, 1964, Ser. No. 415,594
2 Claims. (Cl. 17—45)

The present application is a division of my application 207,701, filed July 5, 1962 which in turn is a division of my application 839,965, filed September 14, 1959, now patent 3,081,483, issued March 19, 1963.

This invention relates to a method for animal immobilization. In ordinary usage the immobilization will be preliminary to slaughtering but it may also be done in connection with surgical or medical treatment by a veterinarian.

The invention contemplates confining an animal and immobilizing it by anesthetization while it is confined. In the preferred organization successive animals are delivered singly into cages mounted on the outer periphery of a turntable for indexing movement. Each such cage has bearing supports upon which the cage may be inverted. Each cage also is provided with animal-confining means for immediate adjustment of the width of the cage to the width of the animal so that the animal will be firmly confined when the cage turns over.

As the turntable indexes, the cage in which the animal is confined is quickly inverted, thus confining the animal on its back. This immediately renders the animal completely helpless. On the turntable there are immobilizing means for application to the individual animals in their respective cages during turntable rotation. As disclosed, there are gas masks at each immobilizing station connected with a source of desensitizing gas and applicable by an attendant to the individual animals inverted in their respective cages. Thus, during successive indexing movements of the turntable, the animals are being subjected to a desensitizing gas which is supplied to their respective masks by forced circulation. Before the turntable has completed one rotation, the animals are unconscious. This enables the animal to be bled without convulsing, kicking or squealing.

An important feature of this invention consists in the arrangement whereby the gas used for desensitization of the animals is constantly being recirculated through the masks. The masks have special features adapting them for application to various sizes of animals, as well as a recirculating arrangement which practically eliminates loss of gas and makes the invention very economical in use.

Details of the foregoing structure and incidental apparatus will be described specifically with reference to the attached drawings.

In the drawings:

FIG. 1 is a plan view with certain parts omitted of apparatus embodying the invention.

FIG. 2 is a fragmentary side elevational view, with certain parts omitted, taken generally on the line 2—2 of FIG. 1.

FIG. 3 is an enlarged detail view in plan of a set of animal control gates and means for the operation thereof.

FIG. 4 is an enlarged detail view in side elevation similar to a portion of FIG. 2 but on a larger scale, portions of the apparatus being broken away.

FIG. 5 is a view of one of the invertible cages on the turntable as it appears in end elevation in the plane indicated at 5—5 in FIG. 4.

FIG. 6 is an enlarged detail view of the indexing ratchet of the turntable.

FIG. 7 is an enlarged detail view of the immobilizing mask taken generally along line 7—7 of FIG. 8.

FIG. 8 is an end elevation of the mask shown in FIG. 7.

FIG. 9 is a fragmentary sectional view of a portion of the invertible cage and bleeding rack and shackle conveyor as viewed from the standpoint indicated at 9—9 in FIG. 1.

FIG. 10 is a view of the bleeding rack in cross section on the line 10—10 of FIG. 9.

FIG. 11 is an enlarged detail view with certain parts omitted of the motorized portion of the loading rack taken along line 11—11 of FIG. 1.

FIG. 12 is a view similar to FIG. 11 showing a modified loading ramp structure.

FIG. 13 is a view taken in section on the line 13—13 of FIG. 12.

The animals enter the apparatus from a pen 15 of which a portion of the wall is shown at 16 in FIG. 1. They are advanced subject to the control of metering apparatus which includes a smaller pen 17 communicating with pen 15 through an opening at 18 and having a movable partition 19 pivoted to sweep across said opening from the full line position of FIG. 1 to the dotted line position shown therein subject to the control of a ram 20.

As the partition 19 approaches the wall 21 of the metering pen 17, the animal is confined and can progress only forwardly through the pivoted gate 22. This gate is normally retracted in the position which is shown in full lines and may be advanced by ram 23 to a dotted line position behind the animal to prevent him from backing away from the ramp leading to the immobilizing cages on the conveyor hereinafter to be described.

The ramp includes a relatively fixed ramp portion 24 and a motorized ramp portion 25, the later being in the nature of a treadmill but operated to advance the animals forwardly. An animal can stand motionless upon ramp portion 24 pending disposition of an animal which is already being propelled upwardly on ramp portion 25. Between these two ramp portions, there are gates 27, 28 which are oscillatory upon rock shafts 29 and 30, and connected for concurrent operation. In the particular arrangement shown, gear segments 31 and 32 on rock shafts 29 and 30 provide the desired connection. Operation of the illustrated device is by means of a ram 33 acting on one of the rock shafts through a rocker arm 34. Gates 27 and 28 present arcuate surfaces of substantial uniform radius to the animal which may be standing on the stationary ramp portion 24 so that the opening of the gate does not frighten the animal or tend to push it rearwardly on such ramp portion.

When the motorized ramp portion 25 is free, the gates 27 and 28 will be opened by swinging them out in front of the animal and the animal will be caused by prods or otherwise to advance onto the movable ramp portion 25 which comprises a conveyor which may be driven from motor 35 (FIG. 11) through a gear reducer 36. The animal is laterally confined by side walls 37 and 38 which are desirably hinged at their bottom margins as shown at 39 and 40 in FIG. 11, whereby they may be adjusted to confine closely animals of different sizes, regardless of the animal's width. FIGS. 12 and 13 show a motorized ramp portion which is identical so far as the conveyor apron 25 is concerned but has, in conjunction with the motorized supporting belt, side walls 371 and 381 which likewise comprise motorized aprons so that the animal will be positively propelled forwardly both by the belt 25 on which his feet are supported and by the sides 371 and 381 which may engage his flanks.

At the forward end of the motorized ramp section 25, there is a loading station 125 which desirably includes another set of the pivoted gates 271, 281 identical with gates 27, 28 as already described. These are opened as the animal is advanced by the motorized ramp 25 and closed after the animal passes through them and enters the cage generically designated by reference character 50.

As shown, there are eight of the cages 50 mounted on a turntable 51. The turntable may conveniently be supported by wheels 52 from a track 53 as shown in FIGS. 2, 4 and 5.

Each cage comprises a top member 54 and a channel-shaped bottom member 55 mounted within a ring 56 which supports the weight of the cage upon rollers 57 on the turntable. By rotating the cage upon the bearings provided by the ring 56 and rollers 57, each cage individually may be inverted. To steady the cage in its inverting rotation, there is a stud 59 on the cage front wall 58 which projects into a bearing 60 mounted on stand 61 on the turntable. With the cage right-side-up the front opening which is then above the stud 59 is closed by a hinged frame wall portion 560 which may later be opened in the inverted position of the cage to permit ready access to the animal's head and to aid in permitting the animal to be immobilized.

The cage sides include relatively movable side wall portions 62 (FIG. 5), these being hinged at 63 to the flanges of the bottom channel 55. The channel is wide enough for the animal's feet. The sides diverge upwardly at an included angle which may be varied by oscillating the respective side walls 62 upon their hinges 63 through the medium of rams 67. The sides will ordinarily be retracted sufficiently so that the animal will move freely into the cage. When the animal is in the cage and the gates 271, 281 are closed behind him, the rams 67 will be charged with fluid pressure to pivot the side walls 62 of the cage into engagement with the sides of the animal, thereby closely confining the animal against movement in any direction.

The cage is readily rotatable by hand when unloaded. When it contains an animal, it is, of course, fairly heavy. To assist in the inversion of the cage and the animal contained therein, a stationary rubber-covered rail is desirably provided at 69 in a position to be engaged by the cage ring 56 as soon as each cage 50 leaves the loading station in which it registers with the power-operated ram 25 and the gates 271, 281. Thus, as the turntable is indexed, the initial movement will engage the cage ring 56 with rail 69 and the rotation of the ring on the rail will invert the cage and the animal. The cages shown at 500 and 501 and all of the other cages (except at the loading station) are shown in their inverted positions.

Turntable indexing movement may be accomplished in any desired manner but it is convenient to use a ratchet 70 mounted on the turntable shaft 71 and actuated by a pawl 72 carried by lever 73 which is pivoted on shaft 71 and driven by ram 74 under the control of the operator (see FIGS. 2, 4 and 6).

As soon as possible after the animal is confined in the cage by engagement between the hinged sides 62 thereof (certainly as soon as the indexing movement of the cage on turntable 51 has progressed to the point where the animal is helpless) the animal will be immobilized by applying over the animal's mouth and nose a mask such as that shown at 75 in FIGS. 7 and 8. This mask comprises a shell 86 having a gas inlet pipe 77 which serves as a handle for the manipulation of the mask. The mask desirably has a gas circulating return pipe 78. At the front of the shell 76, a slit diaphragm 80 is fixed by a ring 81. The diaphragm has a transverse slit at 82 with beaded margins 83 toward which the diaphragm converges inwardly at 84 as best shown in FIG. 7. When the mask is forced partially onto the snout of an animal as shown in dotted lines in FIG. 7, the slit receives the animal's snout, the beaded margins being separated as shown in dotted lines, the fit around the animal's snout is sufficiently close to require the animal to breathe air saturated with the immobilizing gas to any desired extent.

To keep the mask from falling away from the animal's snout, its gas inlet 77 desirably has the form of a rigid pipe serving as a handle for manipulation of the mask and flanged at 86, 87, 88 for engagement with the forked upper end of a standard 89 as shown in FIG. 1 and FIG. 4. The selective positioning of the pipe 77 with the respect to the standard will hold the mask to the animal's head in any position at which the respective flange 86, 87 or 88 is engaged with the standard 89. A flexible hose 90 connects the end of pipe 77 with a manifold 91 that encircles the gas mixture tank 92.

The gas cylinder 93 opens into the tank 92 through an equalizer valve 94 which maintains the mixture approximately constant but which forms no part of the present invention. A blower 95 delivers the mixture from the tank 92 into the manifold 91 which supplies the various masks. The flexible return hoses 78 from the several masks lead into a manifold 96 whereby the mixture is recirculated into the tank 92. The slight pressure provided by the blower 95 assures that any leakage through the diaphragm which confines the animal's head will tend to be outward rather than inward. At the same time, there is not a great deal of pressure within the mask because of the recirculation provided by the hoses 78 which return the gas to the tank at the suction side of the blower. The mask eliminates the tunnel and pit methods in present day use, making possible a more efficient use of gas and rendering animals unconscious in a shorter time. The animals are so firmly confined, they are unable to thresh wildly about (as with tunnel and pit methods for effecting immobilization) thus preventing them from causing extensive carcass damage to themselves. The mask is of considerable importance for confining gas if lighter than air immobilizing gases are used.

If the animal is merely to be slaughtered it is not necessary to use a gas which anesthetizes the nerve centers of the animal. In preferred practice, the gas used is carbon dioxide. Nitrogen, argon or other non-toxic inert gases which temporarily render the animal unconscious simply by depriving him of adequate oxygen, could also be used.

The weight of the animal in the inverted cage will tend to maintain the cage inverted. When the animal is withdrawn, following immobilization, the cage will tend to return by gravity to its original erect position.

The immobilized animals may, for some purposes, be unloaded at any station in the course of advance of their respective cages with the turntable. In preferred practice of the invention, the unloading station 100 is immediately adjacent the loading station 125. The unloading station is that at which FIG. 1 shows a cage 506. Extending outwardly from the unloading station is the bleeding rack 100 as best shown in FIGS. 1, 9, 10. This rack comprises a frame 101 with a supporting strip 102 on which the weight of the immobilized animal is carried. At suitable spacing along the sides are tubular bars 103, 104, 105 between which the body of the animal is confined. Beneath the rack is a blood-collecting trough 106 which is preferably inclined or has a pitched bottom 107.

Extending longitudinally along the rack overhead is a shackle conveyor run 110. Only a portion of the endless conveyor is illustrated. In passing over a sprocket 111 remote from the turntable, the conveyor has a run extending upwardly as shown at 112 in FIG. 9.

Depending at intervals from the conveyor are the thongs 113 with shackles 115 at their ends. An attendant will engage such a shackle with the hoof of an immobilized animal as the latter lies within the cage at the unloading point. The side wall portions 62 of the cage being retracted by the relief of pressure in the ram cylinders 67, the animal will be released so that the continued movement of the conveyor will cause the shackle to pull the animal along the rack. Immediately the animal will be "stuck" by opening a blood vessel in its neck.

As the animal slides along the rack, its blood will flow into the trough 106 and will be delivered to a suitable point of collection. Meantime, by the time the conveyor run 112 lifts the shackle and the animal to which it is attached, the animal will no longer have strength to resist and will no longer have sufficient blood left in its veins to cause damage to the meat if a blood vessel ruptures in the animal's shackled leg when the animal is lifted. Thus, damage to or loss of the valuable ham meat is almost completely eliminated. See my Patent 2,978,737, whereby the use of such a bleeding rack and the method of immobilizing and bleeding as above described has been disclosed. An important feature is to carry the weight of the animal along the bleeding rack until bleeding has progressed sufficiently far so that no damage to the shackled leg will result when the animal is lifted. The entire animal weight is supported from below, with or without movement along the rack, until the bleeding is almost completed, rendering it incapable of effective resistance, after which the animal is then lifted and suspended from above for the completion of bleeding.

Apart from the subcombination claims relating to bleeding, the invention includes a method of immobilization which involves the lateral confinement of an individual animal while the animal is in the course of movement on the turntable conveyor along a predetermined path of travel between the loading station 125 and the discharge station 100. FIG. 5 shows the animal so confined. The method contemplates the animal's inversion immediately preceding the immobilization. As explained above, the inverted animal is completely helpless and cannot resist the ensuing immobilization by gas or otherwise. The method includes the application of a mask to each individual animal, a supply of the immobilizing gas to the mask preferably being recirculated therethrough. FIG. 7 illustrates application of the gas mask over the snout of the animal whereby hise nose is completely enclosed. This eliminates the tunnel and pit treatments heretofore proposed and makes much more efficient use of the gas. A single operator stationed on the turntable can do the immobilizing by applying the gas mask when the animal is fixed against movement and removing it when the animal has been immobilized by the gas. When the cage stops in registry with the unloading station 100, a shackle connected with the overhead conveyor 110 will be attached to the hoof of the immobilized animal as above described. The lateral pressure of the movable side walls of the cage will be relieved and the conveyor will draw the animal from the cage and along the bleeding rack.

The only interruption in the entire procedure is that required for loading the animal into the cage and confining it immovable therein.

While the invention has been described with particular reference to animal slaughtering, those skilled in the art will recognize that animals may be handled in the appropriate portion of this apparatus for other purposes, including treatment by a veterinarian, the lateral confinement of the animal and inversion of his cage being sufficient, without more, to protect both the animal and the veterinarian. Similarly, for other purposes, it may be desired to administer gas to an animal without the inversion step and for purposes other than slaughtering. The mask, particularly as used with the means for preventing displacement thereof by locking the mask and animal against separation, is a convenient device for these purposes.

I claim:

1. A method of immobilizing animals which consists in the steps of confining an animal, applying a gas mask over the mouth and nostrils of an animal so confined, supporting the mask against withdrawal from the mouth and nostrils of the animal, and substantially continuously recirculating an immobilizing gas between the mask and a source of such gas until the animal is immobilized.

2. A method according to claim 1 in which the step of confining the animal further includes inverting the animal.

References Cited by the Examiner

UNITED STATES PATENTS 2,960,985 11/1960 Wiese _____ 128—188
3,118,174 1/1964 Hughes _____ 17—45

SAMUEL KOREN, *Primary Examiner.*

LUCIE H. LAUDENSLAGER, *Examiner.*